United States Patent
Brant et al.

(10) Patent No.: US 9,218,194 B2
(45) Date of Patent: *Dec. 22, 2015

(54) DISTRIBUTED VIRTUAL MACHINE IMAGE MANAGEMENT FOR CLOUD COMPUTING

(71) Applicant: International Business Machines Corporation, Armonk, NY (US)

(72) Inventors: Charles D. Brant, Raleigh, NC (US); Samar Choudhary, Morrisville, NC (US); Michael John Garrison, Austin, TX (US); Michael McKay, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/943,773

(22) Filed: Jul. 16, 2013

(65) Prior Publication Data

US 2015/0020067 A1  Jan. 15, 2015

Related U.S. Application Data

(63) Continuation of application No. 13/941,043, filed on Jul. 12, 2013.

(51) Int. Cl.
*G06F 9/455* (2006.01)
*G06F 12/00* (2006.01)
*G06F 12/08* (2006.01)

(52) U.S. Cl.
CPC ........ *G06F 9/45533* (2013.01); *G06F 9/45558* (2013.01); *G06F 12/0888* (2013.01)

(58) Field of Classification Search
None
See application file for complete search history.

(56) References Cited

U.S. PATENT DOCUMENTS

| 6,760,812 B1* | 7/2004 | Degenaro et al. ............. 711/133 |
| 8,073,926 B2 | 12/2011 | Traut et al. |
| 2007/0094348 A1 | 4/2007 | Scheidel et al. |
| 2010/0122052 A1* | 5/2010 | Waldspurger et al. ........ 711/162 |
| 2010/0138827 A1 | 6/2010 | Frank et al. |
| 2011/0219372 A1 | 9/2011 | Agrawal et al. |
| 2012/0192175 A1 | 7/2012 | Dorai et al. |
| 2012/0221744 A1 | 8/2012 | Heywood et al. |
| 2012/0243795 A1 | 9/2012 | Head et al. |
| 2012/0254370 A1 | 10/2012 | Bacher et al. |
| 2014/0059226 A1* | 2/2014 | Messerli et al. ............... 709/226 |
| 2014/0115228 A1* | 4/2014 | Zhou et al. .................... 711/102 |

OTHER PUBLICATIONS

Peng et al., VDN: Virtual Machine Image Distribution Network for Cloud Data Centers, Proceedings IEEE INFOCOM, Mar. 2012.

* cited by examiner

*Primary Examiner* — Tammy Lee
(74) *Attorney, Agent, or Firm* — Steven M. Greenberg, Esq.; CRGO Law

(57) ABSTRACT

Embodiments of the present invention and provide a method for distributed virtual machine (VM) image management in a cloud computing management includes receiving in a hypervisor executing in memory of a host computer, a request for VM image data from a VM and determining whether or not the requested VM image data is present in a local cache of either the hypervisor of the host computer or in a cache of a hypervisor of a peer host. The method additionally includes retrieving the requested VM image data from a seed image in a remote data store in the cloud computing environment only when it is determined that the VM image data neither is present in the local cache of the hypervisor of the host computer nor is present in the cache of the hypervisor of the peer host.

5 Claims, 2 Drawing Sheets

DISTRIBUTED VIRTUAL MACHINE IMAGE MANAGEMENT FOR CLOUD COMPUTING

CROSS-REFERENCE TO RELATED APPLICATIONS

This application claims priority to U.S. patent application Ser. No. 13/941,043, currently pending, filed Jul. 12, 2013, the entirety of which is incorporated herein by reference.

BACKGROUND OF THE INVENTION

1. Field of the Invention

The present invention relates to the field of virtualization and more particularly to virtual machine (VM) image retrieval in a virtualized computing environment 2. Description of the Related Art For many decades, computing implied both an application and a supporting platform. Until the late twentieth century, a host computing environment included a hardware infrastructure of processor core, input/output, memory and fixed storage, the combination of which supported an operating system, which in turn supported the execution of a single application at a time. Gradually, as processor power increased exponentially, advanced forms of the operating system enabled both simulated and actual multi-tasking such that multiple applications could execute within the same host computing environment.

Initially, applications were self contained bundles of logic relying on little other than core object files and related resource files. As computing become integral to modern industry, however, applications became co-dependent on the presence of other applications such that the requisite environment for an application included not only the underlying operating system and supporting hardware platform, but also other key applications including application servers, database management servers, collaboration servers and communicative logic commonly referred to as middleware. Given the complexity of application and platform interoperability, however, different combinations of applications executing in a single hardware platform can demonstrate differing degrees of performance and stability.

Virtualization as a technology aims to interject a layer between the hardware platform and operating system and executing applications. From the perspective of business continuity and disaster recovery, virtualization provides the inherent advantage of environment portability. Specifically, to move an entire environment configured with multiple different applications is a matter of moving a virtual machine (VM) image from one supporting hardware platform to another. Further, more powerful computing environments can support the coexistence of multiple different VM images, all the while maintaining a virtual separation between the VM images. Consequently, a failure condition in one VM image cannot jeopardize the integrity of other co-executing VM images in the same hardware platform.

A VM monitor, known in the art as a "hypervisor", manages the interaction between each VM image and the underlying resources provided by the hardware platform. In this regard, a bare metal hypervisor runs directly on the hardware platform much as an operating system runs directly on hardware. By comparison, a hosted hypervisor runs within a host operating system. In either case, the hypervisor can support the operation of different VM images—the number of VM images being limited only by the processing resources of a VM container holding the VM images or the hardware platform itself.

Of note, virtualization has been extended to the cloud computing environment. Cloud computing refers to Internet-based computing, whereby shared resources, software, and information are provided to computers and other devices on demand. Cloud computing typically involves over the-Internet-provision of dynamically scalable and often virtualized resources and is a byproduct and consequence of the ease-of-access to remote computing sites provided by the Internet. Of note, within the cloud computing environment, the creation of large numbers of VM instances often requires the repeated copying of a substantial volume of data from a single data source in the "cloud". Consequently, a potential bottleneck can result in terms of how quickly the single data source can serve the data. Further, the creation of large numbers of VM images in a single data source can provide for an adverse impact upon a single network segment through which data must flow from the single data source. Finally, the creation of large numbers of VM images in a single data source potentially represents a single point of failure resulting from disk failure, network failure or other such resource failure.

BRIEF SUMMARY OF THE INVENTION

Embodiments of the present invention address deficiencies of the art in respect to VM image management in the cloud computing environment and provide a novel and non-obvious method, system and computer program product for distributed VM image management in a cloud computing management. In an embodiment of the invention, a method of distributed VM image management in a cloud computing environment includes receiving in a hypervisor executing in memory of a host computer, a request for VM image data from a VM and determining whether or not the requested VM image data is present in a local cache of either the hypervisor of the host computer or in a cache of a hypervisor of a peer host. The method additionally includes retrieving the requested VM image data from a seed image in a remote data store in the cloud computing environment only when it is determined that the VM image data neither is present in the local cache of the hypervisor of the host computer nor is present in the cache of the hypervisor of the peer host.

In one aspect of the embodiment, the VM image data is retrieved from the cache of the hypervisor of the peer host only when it is determined that the VM image data is not present in the local cache of the hypervisor of the host computer, but is present in the cache of the hypervisor of the peer host. Thereafter, the VM image data retrieved from the cache of the hypervisor of the peer host is cached in the local cache in response to a determination that the VM image data had been previously retrieved from the cache of the hypervisor of the peer host a threshold number of times. In another aspect of the embodiment, the VM image data retrieved form the seed image is cached in the local cache and a descriptor of content of the local cache is updated to indicate the caching of the VM image data in the local cache. In yet another aspect of the embodiment, it is determined whether or not the requested VM image data is present in a copy on write (COW) data store of the hypervisor of the host computer. As such, the requested VM image data is retrieved from the seed image in the remote data store in the cloud computing environment only when it is determined that the VM image data neither is present in the local cache of the hypervisor of the host computer nor is present in the cache of the hypervisor of the peer host nor is present in the COW data store.

In another embodiment of the invention, a virtualization data processing system is configured for distributed VM image management in a cloud computing environment. The system includes a host computer including memory and at least one processor and configured for communicative coupling to different peer hosts in a cloud computing environment. The system also includes a hypervisor executing in the memory of the host computer and managing different VMs. The system yet further includes a local cache of the hypervisor storing different portions of a VM image. Finally, the system includes a torrent-style client coupled to the hypervisor. The client includes program code enabled upon execution in the memory to respond to a request in the hypervisor for VM image data from one of the VMs by determining whether or not the requested VM image data is present in the local cache of either the hypervisor or in a cache of a hypervisor of any of the different peer hosts, and by retrieving the requested VM image data from a seed image in a remote data store in the cloud computing environment only when it is determined that the VM image data neither is present in the local cache of the hypervisor nor is present in the cache of the hypervisor of the any of the different peer hosts.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for distributed VM image management in a cloud computing environment. In accordance with an embodiment of the invention, a portion of a VM image can be retrieved by a hypervisor from a remotely disposed seed in a cloud computing environment. The retrieved VM image can be cached in a local cache memory of the hypervisor and the content of the local cache memory broadcast to proximate other hypervisors. Thereafter, upon request by one or more of the other hypervisors, the cached VM image can be transmitted to the one or more of the other hypervisors in lieu of the one or more of the hypervisors retrieving the cached VM image from the remotely disposed seed.

Figure 1:
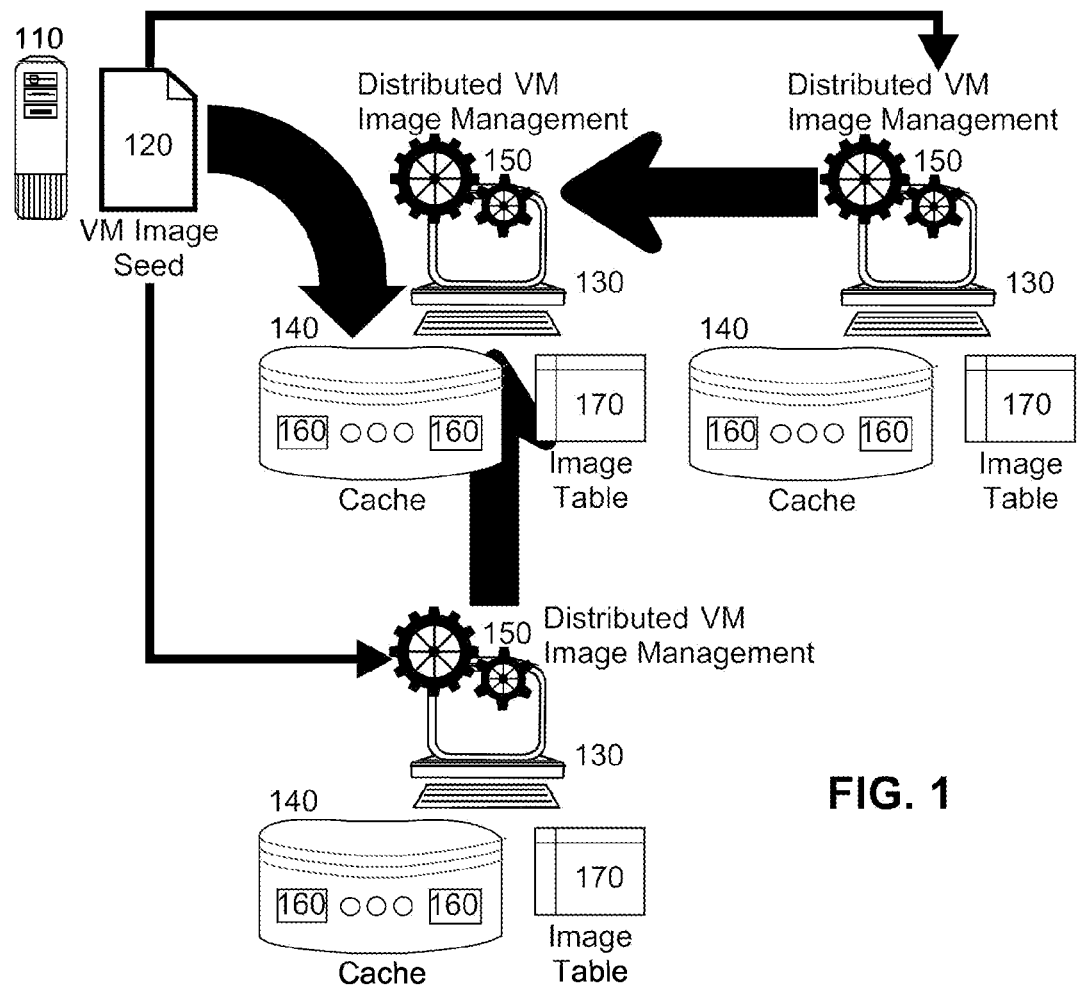
FIG. 1 is a pictorial illustration of a process for distributed VM image management in a cloud computing environment.

In further illustration, FIG. 1 pictorially shows a process for distributed VM image management in a cloud computing environment. As shown in FIG. 1, a seed image 120 of a VM can be disposed in a remote data source 110. A set of peer hosts 130 each can apply corresponding distributed VM image management logic 150 to respond to requests for data 160 from the VM image seed 120 by retrieving the requested data 160, if available, first in a local cache 140 for a corresponding hypervisor. If the logic 150 determines the data 160 to not be present in the local cache 140, a descriptor 170 for the content of peer ones of the cache 140 can be consulted to determine whether or not the data 160 can be retrieved from the peer ones of the cache 140. If not, the requested data 160 can be retrieved directly from the seed 120 in the remote data source 110. In this way, the data 160 can be distributed about the different peer hosts 130 in a cloud computing environment without suffering potential bottlenecks, without overburdening any single network segment and without becoming exposed to any single point of failure in a given one of the peer hosts 130.

Figure 2:
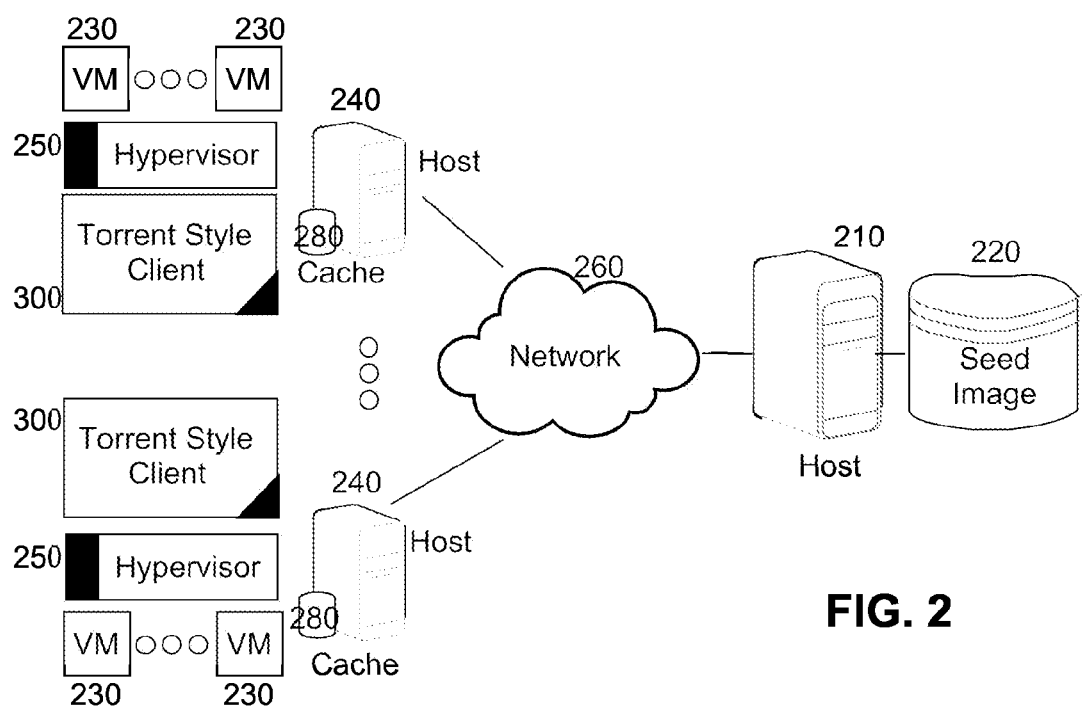
FIG. 2 is a schematic illustration of a virtualization data processing system configured for distributed VM image management in a cloud computing environment; and, FIG. 3 is a flow chart illustrating a process for distributed VM image management in a cloud computing environment.

The process described in connection with FIG. 1 can be implemented in a virtualization data processing system. In yet further illustration, FIG. 2 schematically shows a virtualization data processing system configured for distributed VM image management in a cloud computing environment. The system can include a host computing platform 210 including a data store 220 storing a seed image of a VM. The host computing platform 210 can be communicatively coupled to different peer hosts 240, each including at least one server with memory and at least one processor. Each of the peer hosts 240 can support the operation of a hypervisor 250 managing one or more VMs 230 and including a cache 280. Optionally, a COW data store can be provided for each of the hypervisors 250 in the memory of corresponding ones of the peer hosts 240.

Of note, a torrent style client 300 can be coupled to the hypervisor either directly, or by way of one or more of the VMs 230. The client 300 can include program code that when executed in the memory of a corresponding one of the peer hosts 240, can be enabled to respond to data requests from a particular one of the VMs 230 by determining first if the requested data is present in the cache 280 of the hosting hypervisor 250. The program code when executed further can be enabled to respond to a failure to locate the requested data in the cache 280 of the hosting hypervisor 250 by determining by way of a published descriptor whether or not a cache 280 of a hypervisor 250 of a peer one of the peer hosts 240 contains the requested data.

The program code when executed yet further can be enabled to respond to a failure to locate the requested data both in the cache 280 of the hosting hypervisor 250 and also in the cache 280 of a hypervisor 250 of the peer one of the peer hosts 240, by retrieving the requested data from the data store 220 storing the seed image. The program code when executed even yet further can be enabled upon retrieving the requested data from the data store 220 storing the seed, image to place the retrieved data into the cache 280 of the hosting hypervisor 250, to update a descriptor for the content of the cache 280, and to publish the updated descriptor to the peer hosts 240.

Figure 3:
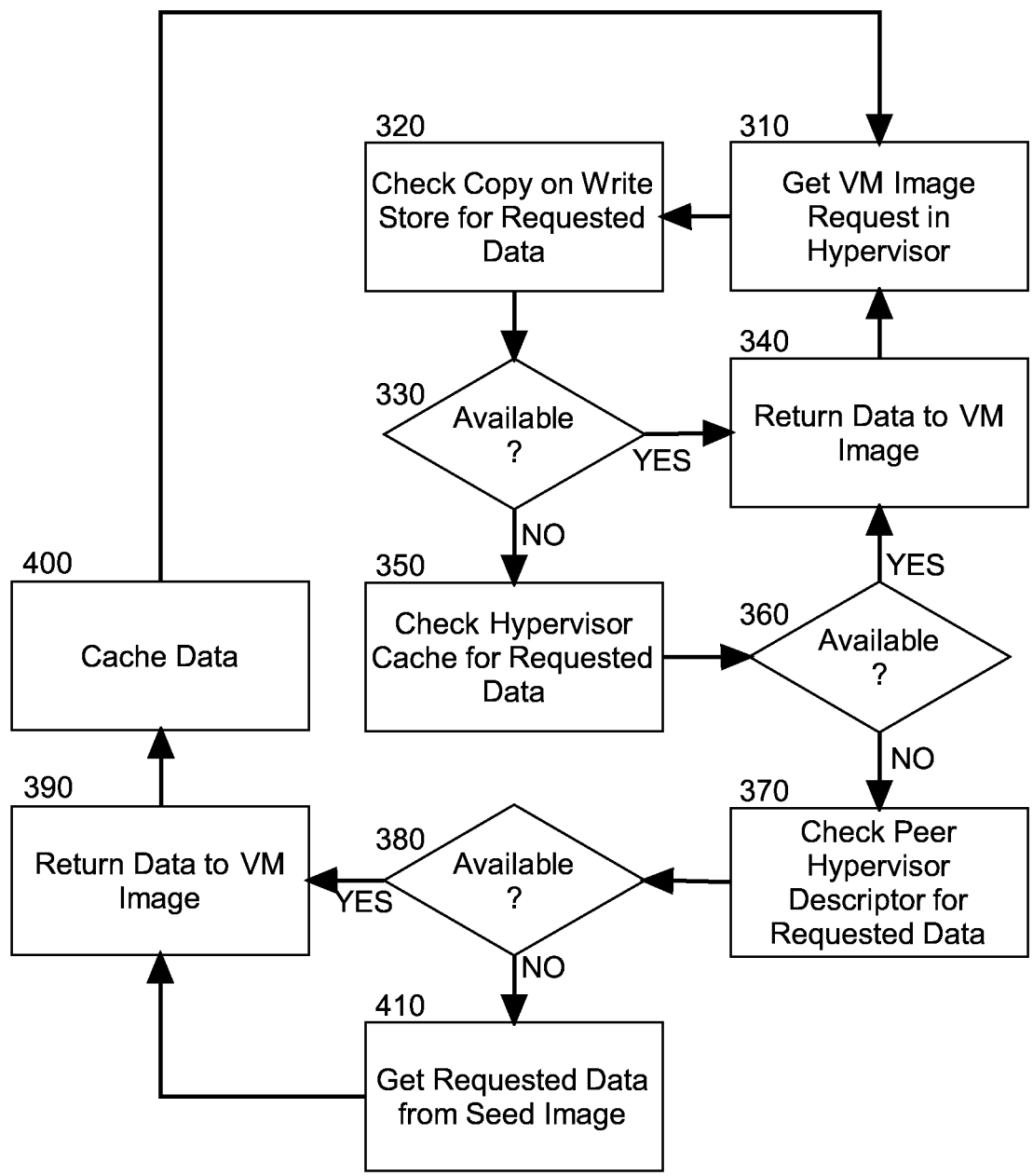

In even yet further illustration of the operation of the torrent style client 300, FIG. 3 is a flow chart illustrating a process for distributed VM image management in a cloud computing environment. Beginning in block 310, a request for one or more blocks of data of a VM image can be received in the hypervisor and in block 320, it can be determined whether or not the data is present in a COW data store for the hypervisor. In decision block 330, if the data is determined to be present in a COW data store of the hypervisor, in block 340 the hypervisor can return the data from the COW data store to the requesting VM and the process can repeat in block 310. Otherwise, the process can continue through block 350.

In block 350, it can be determined whether or not the data is present in a local cache for the hypervisor. In decision block 360, if the data is determined to be present in a local cache of the hypervisor, in block 340 the hypervisor can return the data from the local cache to the requesting VM and the process can repeat in block 310. Otherwise, the process can continue through block 370. In block 370, a descriptor for a local cache of a peer hypervisor can be inspected to determine whether or not the data is present in the local cache of the peer hypervisor. In decision block 380, if the data is determined to be present in the local cache of the peer hypervisor, in block 390 the data can be retrieved from the local cache of the peer hypervisor and returned to the requesting VM. Otherwise, the process can continue in block 410.

In block 410, with the data having been determined not to be present in the local cache of the peer hypervisor, the data can be retrieved from a seed image of the VM in a remote server. Thereafter, in block 390 the retrieved data can be returned to the requesting VM. In either circumstance, in block 400 the retrieved data can be cached contingent upon the data having been either retrieved a threshold number of times from the local cache of the peer hypervisor, or any number of times from the seed image of the VM in the remote server. Thereafter, the process can return to block 310.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of distributed virtual machine (VM) image management in a cloud computing environment, the method comprising:

receiving in a hypervisor executing in memory of a host computer, a request for VM image data for a portion of a VM image;

determining whether or not the requested VM image data is present in either a local cache of the hypervisor of the host computer or in a cache of a hypervisor of a peer host;

retrieving the requested VM image data from a VM image seed in a remote data store in the cloud computing environment only when it is determined that the VM image data neither is present in the local cache of the hypervisor of the host computer nor is present in the cache of the hypervisor of the peer host; and, caching in the local cache of the hypervisor of the host computer the VM image data retrieved from the cache of the hypervisor of the peer host in response to a determination that the VM image data had been previously retrieved from the cache of the hypervisor of the peer host a threshold number of times.

2. The method of claim 1, further comprising:

retrieving the VM image data from the cache of the hypervisor of the peer host only when it is determined that the VM image data is not present in the local cache of the hypervisor of the host computer, but is present in the cache of the hypervisor of the peer host.

3. The method of claim 1, wherein it is determined whether or not the requested VM image data is present in the cache of the hypervisor of the peer host by reference to a descriptor of content of the cache of the hypervisor of the peer host published by the hypervisor of the peer host.

4. The method of claim 1, further comprising:

caching in the local cache the VM image data retrieved from the VM image seed; and, updating a descriptor of content of the local cache to indicate the caching of the VM image data in the local cache.

5. The method of claim 1, further comprising:

determining whether or not the requested VM image data is present in copy on write (COW) data store of the hypervisor of the host computer; and, retrieving the requested VM image data from the VM image seed in the remote data store in the cloud computing environment only when it is determined that the VM image data neither is present in the local cache of the hypervisor of the host computer nor is present in the cache of the hypervisor of the peer host nor is present in the COW data store.

* * * * *